(12) United States Patent
Gupta et al.

(10) Patent No.: US 9,298,344 B2
(45) Date of Patent: Mar. 29, 2016

(54) METHOD AND APPARATUS FOR ENABLING PARTICIPATION IN A WEB CONFERENCE AS A VIRTUAL PARTICIPANT

(71) Applicant: Adobe Systems Incorporated, San Jose, CA (US)

(72) Inventors: Sumeet Gupta, New Delhi (IN); Mili Sharma, Patiala (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 313 days.

(21) Appl. No.: 13/913,975

(22) Filed: Jun. 10, 2013

(65) Prior Publication Data

US 2014/0365921 A1    Dec. 11, 2014

(51) Int. Cl.
| | |
|---|---|
| H04M 3/42 | (2006.01) |
| G06F 3/0481 | (2013.01) |
| H04L 29/06 | (2006.01) |
| H04N 21/431 | (2011.01) |
| H04N 21/4786 | (2011.01) |
| H04N 21/4788 | (2011.01) |
| H04L 12/18 | (2006.01) |
| G06Q 10/10 | (2012.01) |
| H04L 29/08 | (2006.01) |

(52) U.S. Cl.
CPC ........ *G06F 3/04812* (2013.01); *H04L 12/1827* (2013.01); *H04L 65/4038* (2013.01); *H04L 67/38* (2013.01); *H04N 21/4316* (2013.01); *H04N 21/4786* (2013.01); *H04N 21/4788* (2013.01); *G06Q 10/10* (2013.01); *H04L 67/02* (2013.01)

(58) Field of Classification Search
CPC   G06F 3/04812; G06Q 10/10; H04L 12/1827; H04L 65/4038; H04L 67/02; H04L 67/38; H04N 21/4316; H04N 21/4786; H04N 21/4788

USPC ............... 348/14.01–14.16; 370/259–271, 370/351–357; 379/202.01–207.01, 379/67.1–88.28, 201.01, 265.01–266.1; 709/201–207, 217–248
See application file for complete search history.

(56) References Cited

U.S. PATENT DOCUMENTS

| | | | |
|---|---|---|---|
| 6,212,548 B1 * | 4/2001 | DeSimone et al. ........... 709/204 |
| 6,584,493 B1 * | 6/2003 | Butler ..................... G06F 3/038 |
| | | | 709/204 |
| 7,466,810 B1 * | 12/2008 | Quon et al. .............. 379/201.01 |
| 7,574,473 B2 * | 8/2009 | Surazski ................ G06Q 10/10 |
| | | | 709/204 |
| 7,680,895 B2 * | 3/2010 | Perlow et al. .................. 709/207 |
| 8,514,842 B1 * | 8/2013 | Jared et al. .................... 370/352 |
| 8,812,961 B2 * | 8/2014 | Srinivasaraghavan et al. ............................ 715/758 |
| 8,838,694 B2 * | 9/2014 | Mahdi ........................... 709/205 |
| 8,861,704 B2 * | 10/2014 | Jones .................... H04M 3/563 |
| | | | 348/14.08 |
| 2006/0090137 A1 * | 4/2006 | Cheng et al. .................. 715/758 |
| 2006/0174207 A1 * | 8/2006 | Deshpande .................. 715/758 |
| 2007/0288560 A1 * | 12/2007 | Bou-Ghannam et al. ..... 709/204 |
| 2008/0049922 A1 * | 2/2008 | Karniely ................... 379/205.01 |
| 2009/0003339 A1 * | 1/2009 | Katis et al. .................... 370/389 |
| 2011/0317593 A1 * | 12/2011 | Bonkowski et al. .......... 370/260 |
| 2013/0218987 A1 * | 8/2013 | Chudge et al. ................ 709/206 |

* cited by examiner

Primary Examiner — Hemant Patel
(74) *Attorney, Agent, or Firm* — Keller Jolley Preece

(57) ABSTRACT

A computer implemented method and apparatus for enabling participation in a web conference as a virtual participant. The method comprises establishing a web conference comprising at least one virtual participant; receiving at least one message via a web conference user interface; displaying the message in the web conference user interface; and sending the message to the at least one virtual participant via a selected method of message delivery for the at least one virtual participant.

20 Claims, 4 Drawing Sheets

METHOD AND APPARATUS FOR ENABLING PARTICIPATION IN A WEB CONFERENCE AS A VIRTUAL PARTICIPANT

BACKGROUND OF THE INVENTION

1. Field of the Invention

Embodiments of the present invention generally relate to web conferencing and, more particularly, to a method and apparatus for enabling participation in a web conference as a virtual participant.

2. Description of the Related Art

With the rapid growth of the Internet, people are moving to online meetings, presentations and collaboration using various web based tools such as ADOBE CONNECT® available from Adobe Systems Incorporated. A web conference allows conferencing events, such as web meetings, eLearning and webinars to be shared with remote locations. There may be one or more hosts who present a presentation to a plurality of other people. The people involved in the web conference are referred to herein as participants. Such a presentation may include any form of content (e.g., images, text, multimedia and the like) that is disclosed by one or more people to other participants for any purpose (e.g., discussion, collaboration, training, sharing and the like).

During the meeting, participants may enter text, e.g., questions or comments, into a chat area of a web conference user interface. The text is displayed in the chat area of each participant's computing device. One or more participants may then respond to the text, such that the chat conversation is visible to everyone involved in the web conference. However, to view the chat conversation, a participant must be actively participating in the web conference at his or her computer, which is not always possible.

Hence, there remains an unmet need for a method and apparatus for enabling participation in a web conference as a virtual participant.

SUMMARY OF THE INVENTION

A method and apparatus for enabling participation in a web conference as a virtual participant substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
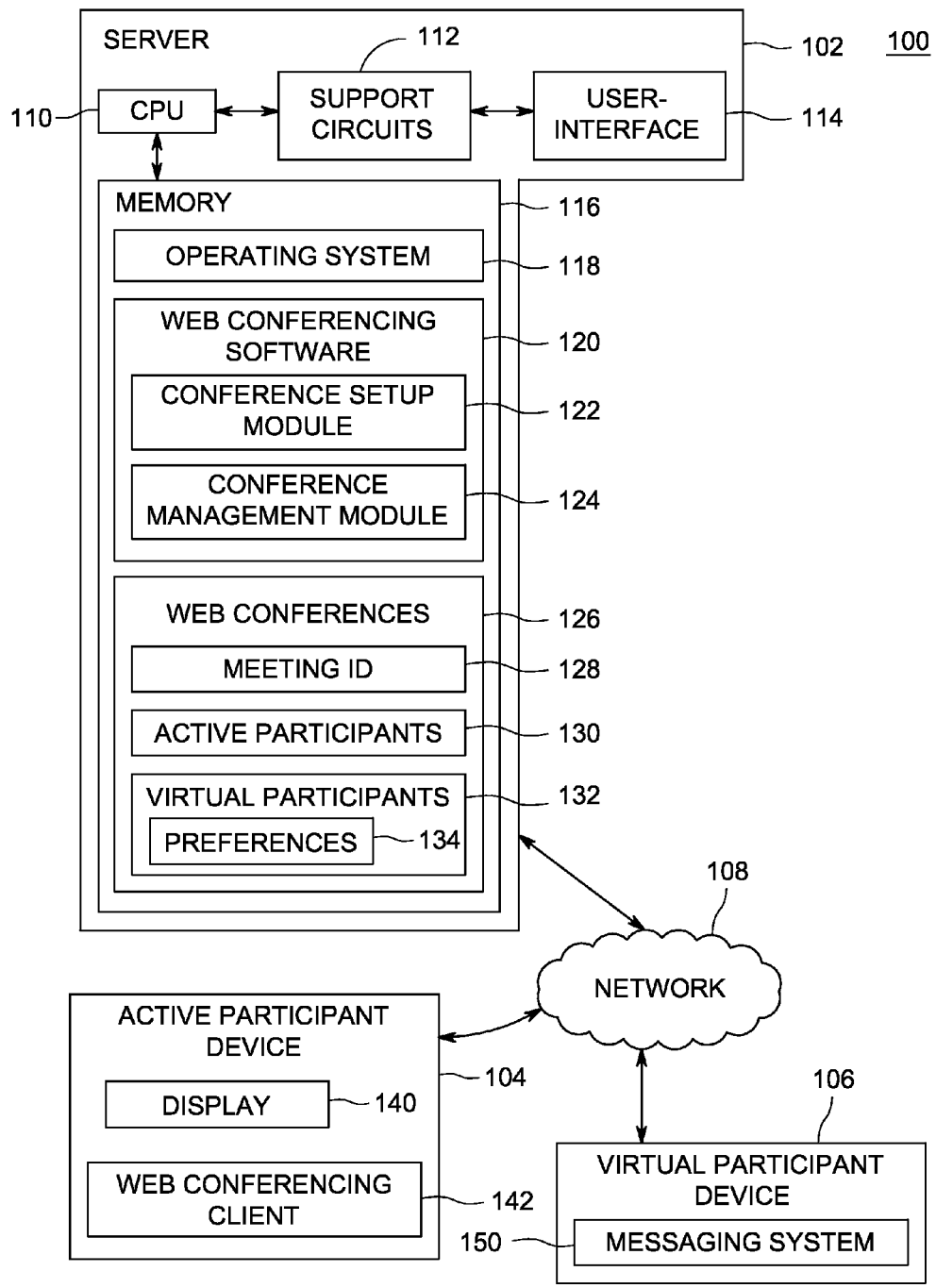
FIG. 1 is a block diagram of a web-based conferencing system that supports virtual involvement of web conference participants, according to one or more embodiments.

While the method and apparatus is described herein by way of example for several embodiments and illustrative drawings, those skilled in the art will recognize that the method and apparatus for enabling participation in a web conference as a virtual participant is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for enabling participation in a web conference as a virtual participant defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for enabling participation in a web conference as a virtual participant. The virtual participant is a participant who is not active in the web conference, meaning the virtual participant need not be at his or her computer and need not be continuously engaged in the web conference, but may be contacted for engagement from the web conference. During the web conference, when one or more participants enter text comments or questions into a chat area (sometimes called a "chat room") of the web conference user interface, the entered text is shared with all active participants and also sent to the virtual participant.

The embodiments identify a virtual participant's selected preferred mode(s) of delivery, e.g., Short Message Service (SMS) text, email, digital audio message, and the like, and then send the text entered into the chat area to the virtual participant using said preferred mode or modes. The embodiments enable a participant to be a virtual participant in more than one web conference. As such, the participant may receive and respond to texts from one or more web conferences. In some embodiments, the text is sent to each virtual participant after a predefined period of time, for example, after 10 seconds, in order to collect multiple texts and responses that are sent and received by the active participants of the web conference. If the virtual participant responds to the text(s), the virtual participant's response appears in the web conference user interface of each active participant.

Additionally, an active participant, typically the host of the web conference, may want screen control of the virtual participant's computer. If the virtual participant specified in the web participant's preferences that screen sharing and/or control is permitted, then screen control is granted to the host automatically. However, if the virtual participant has not specifically allowed screen sharing and/or control in his or her preferences, a request is initiated via the user interface of the web conference, and is sent to the virtual participant in the virtual participant's preferred mode of delivery, e.g., SMS text, email, digital audio message, and the like. In the event that the virtual participant grants the screen control request, the web conferencing software is launched on the virtual participant's computer with control provided to the active participant who made the request.

Advantageously, embodiments of the present invention provide a user the ability to participate in multiple web conferences without needing to be actively engaged in any of them. The user may receive comments and questions from one or more meetings via email, SMS text, or any other preferred method of delivery or combination of deliveries, and respond to the comments and questions. The invention is beneficial to users of web conferencing software, such as ADOBE® CONNECT® and the like.

Various embodiments of a method and apparatus for enabling participation in a web conference as a virtual participant are described. In the following detailed description, numerous specific details are set forth to provide a thorough understanding of the claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a web-based conferencing system 100 that supports virtual participation of web conference participants, in accordance with at least one embodiment of the invention. The system 100 includes a server 102 connected to a plurality of active participant devices 104 via a communications network 108. Each active participant device 104 is a computing device, such as a desktop computer, laptop, tablet computer, smart phone, personal digital assistant (PDA), cellular phone, and the like, and includes a web conferencing client 142, e.g., software executing on the active participant device 104 to facilitate web-based conferencing on the display 140. The system 100 also includes one or more virtual participant devices 106. The virtual participant device 106 may be any computing device, such as a desktop computer, laptop, tablet computer, smart phone, personal digital assistant (PDA), cellular phone, and the like that includes at least a messaging system 150 capable of receiving messages according to the virtual participants' preference 134. The virtual participant device 106 may also include a web conferencing client (not shown). During the web conference, a virtual participant 132 may change devices. For example, a virtual participant 132 may engage in the web conference by receiving email messages using a mobile phone as the virtual participant device 106. The virtual participant 132, during the web conference, may access a laptop computer to receive email messages, thereby changing the virtual participant device 106 to the laptop computer. If the virtual participant 132 should decide to become an active participant 130 at some time during the web conference 126, the virtual participant device 106 must include the web conferencing client 142.

In one embodiment, an on-line presentation environment is provided through execution of a web conferencing software 120 on the server 102, where such software may include, as a non-limiting example, ADOBE® CONNECT™ available from Adobe Systems Incorporated. A web conference allows conferencing events, such as web meetings, eLearning and webinars to be shared with remote locations. ADOBE® CONNECT™ provides web-based conferencing to facilitate multiuser collaboration via chat rooms, digital audio discussions, presentations, webinars, and the like.

The network 108 includes a communication system that connects computers (or devices) by wire, cable, fiber optic and/or wireless link facilitated by various types of well-known network elements, such as hubs, switches, routers, and the like. The network 108 may be a part of an Intranet using various communications infrastructure, such as Ethernet, Wi-Fi, a personal area network (PAN), a wireless PAN, Bluetooth, Near field communication, and the like.

In one embodiment, the server 102 is any computing device, such as a desktop computer, laptop, tablet computer, smart phone, personal digital assistant (PDA), cellular phone, and the like that can act as a web conferencing server. The server 102 includes a Central Processing Unit (CPU) 110, support circuits 112, a user interface 114, and a memory 116. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 includes at least one of Read Only Memory (ROM), Random Access Memory (RAM), disk drive storage, optical storage, removable storage and/or the like. The server 102 facilitates distribution of text chat messages to the various participants concurrently participating in the web conference via the chat area portion of the web conference user interface.

The memory 116 includes an operating system 118, web conferencing software 120, and one or more web conferences 126. The web conferencing software 120 includes a conference setup module 122 and a conference management module 124. Each web conference 126 includes a meeting ID 128, and a plurality of active participants 130, and one or more virtual participants 132. Each virtual participant 132 includes one or more preferences 134, including the virtual participant's preferred mode of message delivery, e.g., one or more of SMS text, email, digital audio message, and the like.

In one embodiment, when a web conference 126 is scheduled, for example, by a host, the host specifies that virtual participation in the web conference 126 is allowed, in which case any invitee may respond as a virtual participant 132. In another embodiment, the host may specifically identify one or more invitees who may participate in the web conference 126 as virtual participants 132. The conference setup module 122 generates a meeting ID 128 for the meeting and sends invitations to the invitees. The invitees who are identified as able to participant as a virtual participants may reply to the invitation as an active participant 130 or as a virtual participant 132. If an invitee replies that he or she is participating as a virtual participant 132, the virtual participant 132 also specifies a preferred mode of message delivery, which the conference setup module 122 stores in preferences 134. Optionally, the virtual participant 132 may also identify whether the web conference server 102 may share and/or control the virtual participants' computer 106 during the web conference 126. Further, the sharing and/or control may be allowed for a particular time or period of time as granted by the virtual participant 132. The conference setup module 122 stores this information in preferences 134 as well.

During a web conference, one or more active participants 130 may enter text, e.g., comments or questions, into a chat area on the display 140. After a participant enters the text, the conference management module 124 on the server 102 pushes the text to the web conferencing client 142 on the active participant devices 104 of others of the one or more active participants 130. The conference management module 124 also identifies the virtual participants 132 associated with the web conference 126, as well as each virtual participant's preferred mode(s) of message delivery e.g., one or more of SMS text, email, digital audio message, and the like. In some embodiments, the conference management module 124 sends the message to the virtual participant 132 as soon as it is entered in the chat area on the display 140. In some embodiments, the conference management module 124 waits a predefined period of time, for example, 10 seconds, and sends the text of all messages that are entered in the chat area in that predefined period of time to each virtual participant 132 according to each virtual participant's preferred method of message delivery. The meeting ID 128 is attached to the message so the virtual participant 132 knows from which web conference 126 the message is coming. The message may also contain any other identifying information, such as the host, other participants, and the like, to assist the virtual participant 132 in identifying the web conference 126 from which the message is received.

The message is received using the messaging system 150 installed on the virtual participant device 106. Using the messaging system 150, the virtual participant 132 may respond to the received message. The response is received by the conference management module 124, which pushes the response to the appropriate web conferencing clients 142 of the active participant's devices 104 for viewing on the display 140 and also sends the response to other virtual participants 132, if any. As such, a virtual participant 132 may be partially involved with one or more web conferences 126 at the same time.

The virtual participant 132 may decide to become actively engaged in the web conference 132 and via a user interface, such as a web conferencing client (not shown), installed on the virtual participant device 106, convert him or herself to an active participant 130. The virtual participant 132 may convert to an active participant 130 at any time during the web conference. For example, the virtual participant 132 may be engaged in the web conference via SMS text messages to the virtual participant's mobile phone. When the virtual participant 132 converts him or herself to an active participant 130, he or she may be engaged using a computing device, such as a desktop computer, laptop, or other device on which the web conferencing client is installed.

At any time during the web conference, an active participant 130, such as the host, may, via the user interface of the web conferencing client 142, request access to a virtual participant's device 106. The request may be a request to share the virtual participant's computer or a request to control the virtual participant's computer. The meeting ID 128 is attached to the request so the virtual participant 132 knows from which web conference 126 the request is coming. The request may also contain any other identifying information, such as the host, other participants, and the like to assist the virtual participant 132 in identifying the web conference 126 from which the request is received.

The request is received using the messaging system 150 on the virtual participant device 106. Using the messaging system 150, the virtual participant 132 may respond to the received request. The response may grant sharing or control by the virtual participant 132. The response may also state a time at which the virtual participant's computer may be shared. Alternatively, the response may deny the request. The response is received by the conference management module 124, which pushes the response to the appropriate web conferencing clients 142 for viewing on the display 140. If the request is granted, the conference management module 124 provides access to the virtual participant's computer 106. If the virtual participant 132 had specified in their preferences 134 that the virtual participants' computer 106 may be shared and/or controlled during the web conference 126, no request is sent and the conference management module 124 provides access to the virtual participant's computer 106 without any communication to the virtual participant 132. If the virtual participant 132 specifies in his or her preferences 134 a specific time at which the virtual participants' computer 106 may be shared and/or controlled during the web conference 126, then the sharing and/or control is only allowed for that specified time. As such, a virtual participant 132 may be actively involved in one web conference 126 and at the same time virtually involved with one or more other web conferences 126.

Figure 2:
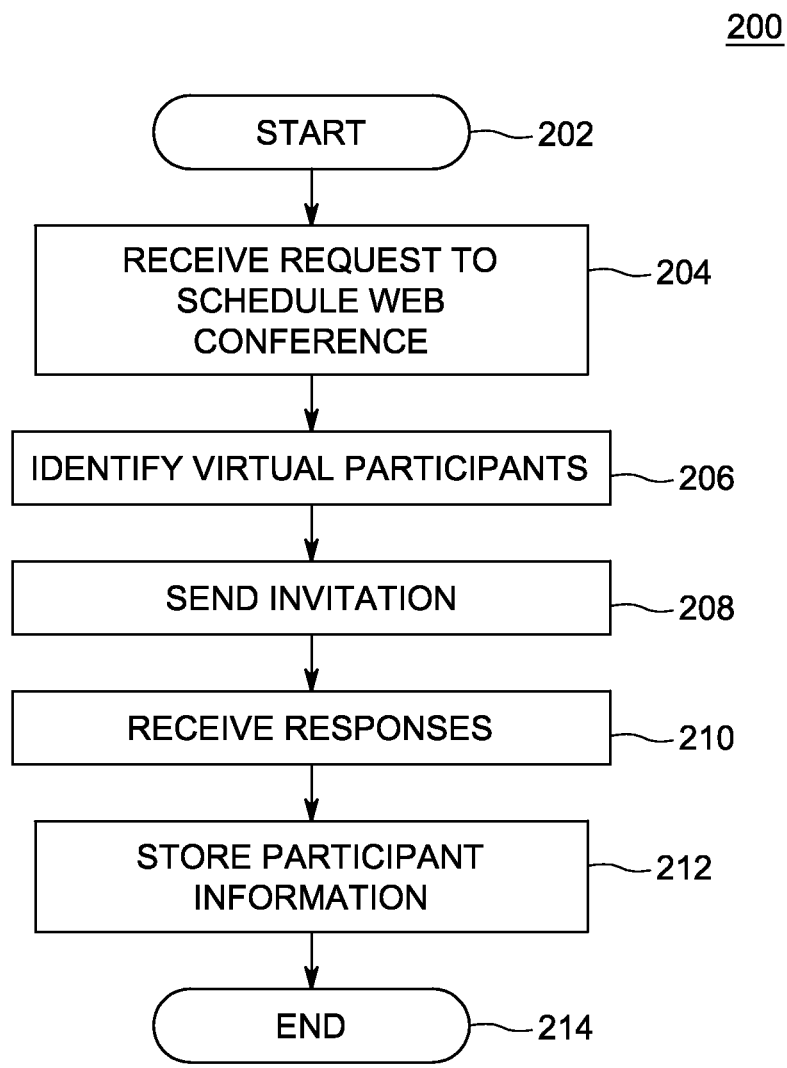
FIG. 2 depicts a flow diagram of a method for setting up a web conference that allows involvement as a virtual participant, as performed by the conference setup module of FIG. 1, according to one or more embodiments.

FIG. 2 depicts a flow diagram of a method 200 for setting up a web conference that allows involvement as a virtual participant, as performed by the conference setup module 122 of FIG. 1, according to one or more embodiments. The method 200 facilitates creating an invitation wherein one or more participants may join the web conference as virtual participants. The method 200 starts at step 202 and proceeds to step 204.

At step 204, the method 200 processes a request to schedule a web conference. A host, or organizer of the web conference may use a web conference scheduling tool, such as ADOBE® CONNECT™ Create New Meeting Wizard. The host may identify a plurality of participants who are invited to take part in the web conference. In some embodiments, the host may identify one or more of the participants who are invited to participate in the web conference as virtual participants. In some embodiments, the host may allow virtual participation without specifying specific participants who may attend as virtual participants, thereby allowing any participant to join the web conference as a virtual participant. The host may also specify a Universal Resource Locator (URL) where the participants may access the web conference. When the host has completed the web conference creation, the method 200 processes the request. The method 200 generates a meeting ID for the web conference and stores the meeting ID, invited participants, and the URL for the web conference.

The method 200 proceeds to step 206, where the method 200 identifies the participants who may participate as virtual participants. In some embodiments participants who may attend the web conference as virtual participants are specifically identified. In some embodiments, where the host allows virtual participation for the entire web conference, all participants are identified as possible virtual participants. For the identified participants, the method 200 provides an option in the invitation to join the web conference as an active participant or a virtual participant.

The method 200 proceeds to step 208, where the method 200 sends the invitation. The method 200 sends the invitation to, for example, an email address associated with each invited participant. The method 200 proceeds to step 210, where the method 200 receives responses to the invitation. Some participants may choose not to respond to the invitation. Instead, the participants may wait until the web conference begins and join the web conference as active participants at the start time of web conference. Participants who choose to accept the web conference invitation, but as virtual participants may also do so in advance or at the start time of the web conference. When a participant chooses to attend a web conference as a virtual participant, they are prompted via a user interface to select their preferred mode of message delivery, e.g., SMS text, email, digital audio message, and the like. Additional information may be requested depending upon the preferred mode. For example, a phone number may be required if the virtual participant has selected to receive messages via SMS text. If the virtual participant would like to have emails sent to a specific email account, the virtual participant may enter the email account information. The virtual participant may also enter other preferences, for example, but not limited to whether the virtual participant pre-approves the sharing or control of the virtual participant's computer.

The method 200 stores which invitees are attending the web conference as active participants, virtual participants, and any specified preferences for the virtual participants. The method 200 proceeds to step 214 and ends.

Figure 3:
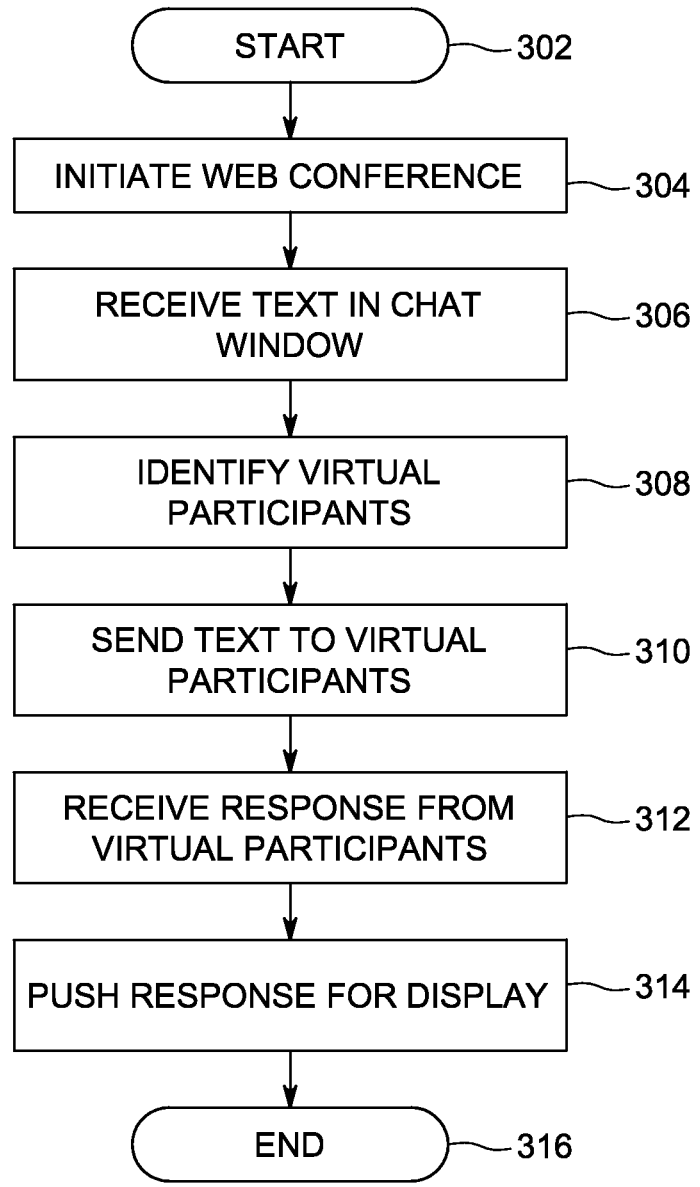
FIG. 3 depicts a flow diagram of a method for interacting with a virtual participant during a web conference, as performed by the conference management module of FIG. 1, according to one or more embodiments.

FIG. 3 depicts a flow diagram of a method 300 for interacting with a virtual participant during a web conference, as performed by the conference management module 124 of FIG. 1, according to one or more embodiments. The method 300 sends text messages entered into a chat area of a user interface for the web conference to all of the web conference's virtual participants via their preferred modes of message delivery. The method 300 starts at step 302 and proceeds to step 304.

At step 304, the method 300 initiates the web conference. In a participant area of the web conference user interface, a list of all participants is provided, with the virtual participants identities displayed in any manner that identifies them as virtual participants. The virtual participants may be in a separate display area, in a dimmer font, or the like. The method 300 proceeds to step 306, where the method 300 receives a text message, e.g., a comment or question, in a chat area of the web conference user interface. The method 300 pushes the text message received in the chat area to be displayed in the chat area of each active participant device.

The method 300 proceeds to step 308, where the method 300 identifies one or more virtual participants on the web conference. The method 300 also determines the preferred mode of message delivery for each virtual participant.

The method 300 proceeds to step 310, where the method 300 sends the text message to each virtual participant. The method 300 includes the meeting ID and any additional information that may identify the web conference to the virtual participant. The virtual participant may be a virtual participant in more than one web conference. Therefore, it is important to identify the web conference from which the text message is received. The method 300 sends the text message, with the meeting identification, to each virtual participant in the virtual participant's preferred mode of message deliver. In some embodiments, the text message is sent to the virtual participant as soon as it is entered in the chat area. In other embodiments, the method 300 waits a predefined period of time, for example, ten seconds, in order to accumulate other responses to the text message in the chat area. After the predefined period of time, the method 300 sends the accumulated text messages to each virtual participant using the virtual participant's preferred mode of message delivery.

The method 300 proceeds to step 312, where the method 300 receives a response from one or more virtual participants. The response contains the meeting ID. Based on the meeting ID, the method 300 pushes the response to each active participant in the web conference associated with the meeting ID. If there are other virtual participants involved in the web conference, the response is then sent to the other virtual participants in accordance with their preferred mode of message delivery.

The method 300 iterates throughout the duration of the web conference. In some embodiments, a text message may be directed to a specific participant, active or virtual. When the text message entered into a chat area is directed to a specific participant, the method 300 directs the text message only to the specific participant using the methods specified above. When the specific participant responds, whether active or virtual, the method 300 directs the response to the participant who entered the original text message. The method 300 proceeds to step 316 and ends.

Figure 4:
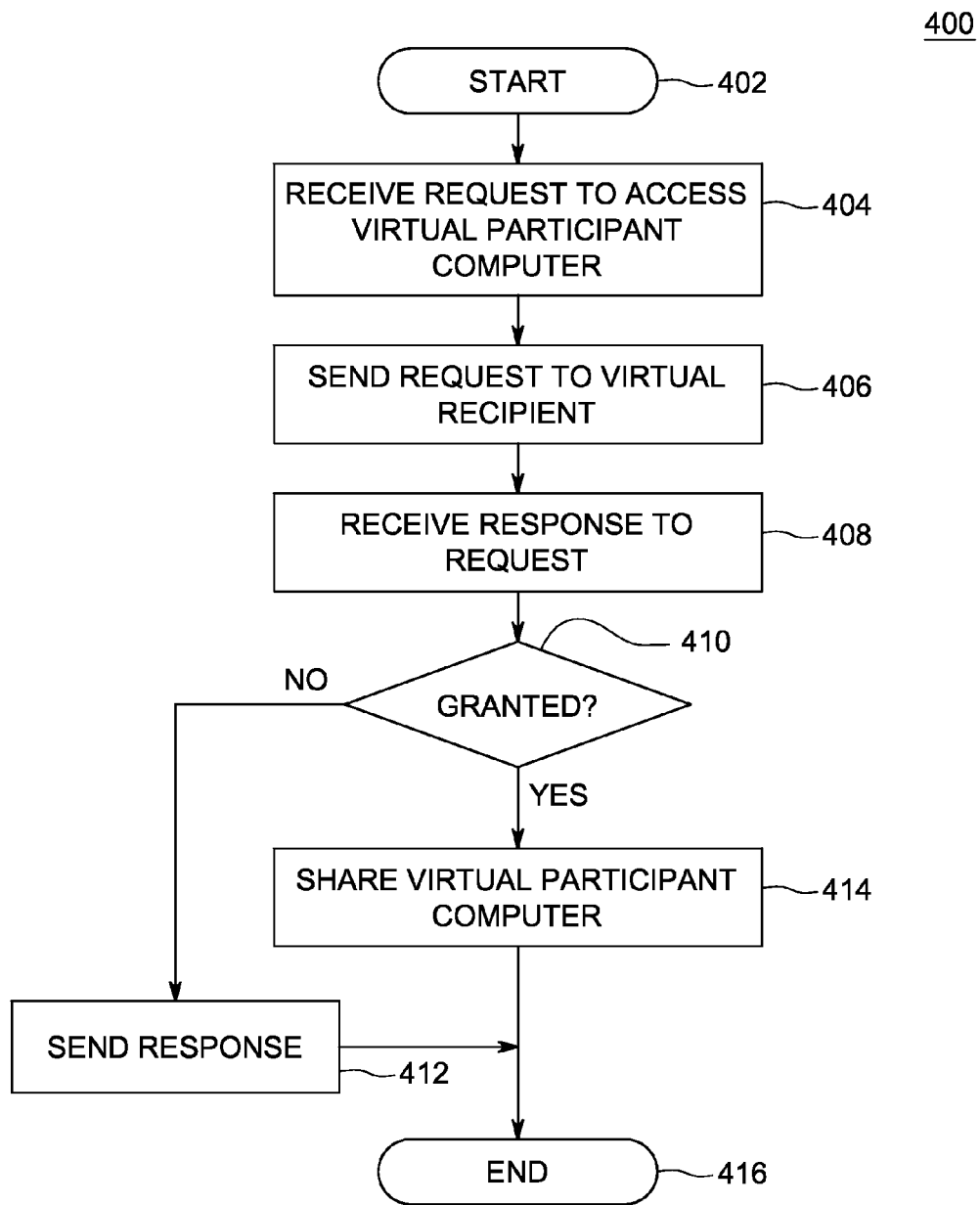
FIG. 4 depicts a flow diagram of a method for requesting screen control from a virtual participant, as performed by the conference management module of FIG. 1, according to one or more embodiments.

FIG. 4 depicts a flow diagram of a method 400 for requesting screen control from a virtual participant, as performed by the conference management module 124 of FIG. 1, according to one or more embodiments. The method 400, upon a receipt of a request to share or control a virtual participant's computer, sends the request via the virtual participant's preferred method of message delivery. Upon the request being granted, the method 400 enables control of the virtual participant's computer. If the virtual participant has specified in his or her preferences that screen sharing or control is permitted, method 400 is not required and control of the virtual participant's computer is granted automatically. The method 400 starts at step 402 and proceeds to step 404.

At step 404, the method 400 receives a request to share a virtual participant's computer. An active participant, typically a host, may use the web conference interface to select a virtual participant and select from, for example, a pull-down menu or other selection tool, a request to access the selected virtual participant's computer. The access options may be, but are not limited to, share an application, share a screen, control the computer, and the like.

The method 400 proceeds to step 406, where the method 400 sends the request to the virtual participant via the virtual participant's preferred mode of message delivery as described above.

The method 400 proceeds to step 408, where the method 400 receives a response from the virtual participant. The method 400 proceeds to step 410, where the method 400 determines whether the virtual participant has granted the request for access to the virtual participant's computer. If the virtual participant denies the request for access, the method 400 proceeds to step 412.

At step 412, the method 400 sends a response to the participant who requested the access explaining that the virtual participant has denied the request. The response may be displayed in the chat area of the web conference or in any area of the web conference visible to the participant who requested the access. The method 400 proceeds to step 416 and ends.

However, if at step 410, the method 400 determines that the request for access to the virtual participant's computer is granted, the method 400 proceeds to step 414. At step 414, the method 400 provides sharing and/or control of the virtual participant's computer to the host. In some embodiments, the virtual participant may manually launch the web conferencing client on the virtual participant's computer and decide to remain a virtual participant or become an active participant in the meeting.

The method 400 proceeds to step 416 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   establishing a web conference comprising a virtual participant associated with at least one virtual participant device and a plurality of active participants associated with a plurality of active participant devices;
   providing a web conference user interface to each of the plurality of active participant devices without providing the display of the web conference user interface to the at least one virtual participant device;
   receiving, from an active participant device of the plurality of active participant devices, at least one message via the web conference user interface;
   posting the at least one message to the web conference user interface provided to each of the plurality of active participant devices; and
   sending the at least one message posted to the web conference user interface provided to each of the plurality of active participant devices to the at least one virtual participant device via a virtual participant selected method of message delivery, other than the web conference user interface, for the virtual participant associated with the at least one virtual participant device.

2. The method of claim 1, further comprising:
   receiving, from the at least one virtual participant device, a response to the at least one message; and
   posting the response to the web conference user interface provided to each of the plurality of active participant devices.

3. The method of claim 1, further comprising
   receiving, from the active participant device, at least one direct message directed to the virtual participant associated with the at least one virtual participant device via the web conference user interface;

sending the at least one direct message to the at least one virtual participant device via the selected method of message delivery for the virtual participant;

receiving, from the at least one virtual participant device, a response to the at least one direct message directed to the virtual participant; and providing the response for display in the web conference user interface sent to the active participant device without posting the response to the web conference user interface provided to one or more additional active participant devices of the plurality of active participant devices.

4. The method of claim 1, wherein the selected method of message delivery is at least one of SMS text, email, or digital audio message.

5. The method of claim 2, further comprising:

sending, to the at least one virtual participant device, a request for control of the at least one virtual participant device by the active participant device;

receiving, from the at least one virtual participant device, a response granting the request for control of the at least one virtual participant device; and providing, to the active participant device, control of the at least one virtual participant device.

6. The method of claim 1, wherein the at least one virtual participant device includes a capability to convert the at least one virtual participant device to an active participant device having access to the web conference user interface during the web conference.

7. The method of claim 1, wherein the at least one message comprises at least one of a comment, question, or a request to share control of the at least one virtual participant device, and wherein the method further comprises providing an indication of the at least one message in at least one of a chat area, comment area, or question area of the web conference user interface.

8. An system for enabling participation in a web conference as a virtual participant comprising:

at least one processor; and at least one non-transitory computer-readable medium storing instructions thereon that, when executed by the at least one processor, cause the system to:

establish a web conference comprising a virtual participant associated with at least one virtual participant device and a plurality of active participants associated with a plurality of active participant devices;

provide a web conference user interface to each of the plurality of active participant devices without providing the display of the web conference user interface to the at least one virtual participant device;

receive, from an active participant device of the plurality of active participant devices, at least one message via the web conference user interface;

post the at least one message to the web conference user interface provided to each of the plurality of active participant devices; and send the at least one message posted to the web conference user interface provided to each of the plurality of active participant devices to the at least one virtual participant device via a virtual participant selected method of message delivery, other than the web conference user interface, for the virtual participant associated with the at least one virtual participant device.

9. The system of claim 8, wherein the instructions further cause the system to:

receive, from the at least one virtual participant device, a response to the message;

post the response to the web conference user interface provided to each of the plurality of active participant devices;

send, to the at least one virtual participant device, a request for control of the at least one virtual participant device;

receive, from the at least one virtual participant device, a control response granting the request for control of the at least one virtual participant device; and provide, to the active participant device, control of the at least one virtual participant device.

10. The system of claim 8, wherein the instructions further cause the system to:

receive, from the active participant device, at least one direct message directed to the virtual participant associated with the at least one virtual participant device via the web conference user interface;

send the at least one direct message to the at least one virtual participant device via the selected method of message delivery for the virtual participant;

receive, from the at least one virtual participant device, a response to the at least one direct message directed to the virtual participant; and provide the response for display in the web conference user interface provided to the active participant device without posting the response to the web conference user interface provided to one or more additional active participant devices of the plurality of active participant devices.

11. The system of claim 8, wherein the selected method of message delivery is at least one of SMS text, email, or digital audio message.

12. The system of claim 8, wherein the at least one virtual participant device includes a capability to convert the at least one virtual participant device to an active participant device having access to the web conference user interface during the web conference.

13. The system of claim 8, wherein the at least one message comprises at least one of a comment, question, or a request to share control of the at least one virtual participant device, and wherein the instructions further cause the system to provide an indication of the at least one message in at least one of a chat area, comment area, or question area of the web conference user interface.

14. A non-transitory computer readable medium for storing computer instructions that, when executed by at least one processor causes the at least one processor to perform a method for enabling participation in a web conference with partial involvement comprising:

establishing a web conference comprising a virtual participant associated with at least one virtual participant device and a plurality of active participants associated with a plurality of active participant devices;

providing a web conference user interface to each of the plurality of active participant devices without providing the display of the web conference user interface on the at least one virtual participant device;

receiving, from an active participant device of the plurality of active participant devices, at least one message via the web conference user interface;

posting the at least one message to the web conference user interface provided to each of the plurality of active participant devices; and sending the at least one message posted to the web conference user interface provided to each of the plurality of active participant devices to the at least one virtual participant device via a virtual participant selected method of message delivery, other than the web conference user interface, for the virtual participant associated with the at least one virtual participant device.

15. The computer readable medium of claim 14, further comprising:
receiving, from the at least one virtual participant device, a response to the message; and
posting the response to the web conference user interface provided to each of the plurality of active participant devices.

16. The computer readable medium of claim 14, further comprising
receiving, from the active participant device, at least one direct message directed to the virtual participant associated with the at least one virtual participant device via the web conference user interface;
sending the at least one direct message to the at least one virtual participant device via the selected method of message delivery for the virtual participant;
receiving, from the at least one virtual participant device, a response to the at least one direct message directed to the virtual participant; and
providing the response for display in the web conference user interface provided to the active participant device without posting the response to the web conference user interface provided to one or more additional active participant devices of the plurality of active participant devices.

17. The computer readable medium of claim 14, wherein the selected method of message delivery is at least one of SMS text, email, or digital audio message.

18. The computer readable medium of claim 15, further comprising:
sending, to the at least one virtual participant device, a request for control of the at least one virtual participant device by the active participant device;
receiving, from the at least one virtual participant device, a control response granting the request for control of the at least one virtual participant device; and
providing, to the active participant device, control of the at least one virtual participant device.

19. The computer readable medium of claim 14, wherein the at least one virtual participant device includes a capability to convert the at least one virtual participant device to an active participant device having access to the web conference user interface during the web conference, and wherein the at least one message is received or displayed in at least one of a chat area, comment area, or question area of the web conference user interface on the at least one virtual participant device that has been converted to an active participant device.

20. The computer readable medium of claim 14, wherein the at least one message comprises at least one of a comment, question, or a request to share control of the at least one virtual participant device.

* * * * *